United States Patent [19]
Duchet et al.

[11] Patent Number: 5,655,037
[45] Date of Patent: Aug. 5, 1997

[54] OPTICAL SELECTOR AND AN OPTICAL LINK INCLUDING THE SELECTOR

[75] Inventors: Christian Duchet, Marcoussis; Guy Le Roy, Lannion, both of France

[73] Assignee: Alcatel N.V., Amsterdam, Netherlands

[21] Appl. No.: 343,944

[22] Filed: Nov. 17, 1994

[30] Foreign Application Priority Data

Nov. 18, 1993 [FR] France ................... 93 13782

[51] Int. Cl.$^6$ ............................................. G02B 6/26
[52] U.S. Cl. ................... 385/16; 385/17; 385/15; 359/128; 359/154
[58] Field of Search ................ 385/16, 15, 17, 385/46; 359/128, 117, 147, 154

[56] References Cited

U.S. PATENT DOCUMENTS

| | | | |
|---|---|---|---|
| 4,998,791 | 3/1991 | Koai | 385/16 |
| 5,245,681 | 9/1993 | Guignard et al. | 385/16 |
| 5,268,975 | 12/1993 | Yoshitani et al. | 385/16 X |
| 5,297,224 | 3/1994 | Shaw | 385/16 X |

OTHER PUBLICATIONS

*Patent Abstracts of Japan*, vol. 17, No. 347 (E–1391) 30 Jun. 1993 & JP-A-05 048 584 (Mitsubishi Electric Corp.) 26 Feb. 1993.

P. Franco et al, "S–280–A new Submarine Optical System", *IEEE Journal on Selected Areas in Communication*, vol. SAC–2, No. 6, Nov. 1984, New York, pp. 801–806.
*Patent Abstracts of Japan*, vol. 17, No. 351 (E–1392) 2 Jul. 1993 & JP-A-05 049 056 (Nippon Telegr. & Teleph. Corp.) 26 Feb. 1993.
*Patent Abstracts of Japan*, vol. 7, No. 158 9E–186) (1303) 12 Jul. 1983 & JP-A-58 068 336 (Nippon Denki K.K.) 24 Apr. 1983.
*Patent Abstracts of Japan*, vol. 7, No. 292 (E–219) (1437) 27 Dec. 1983 & JP-A-58 168 342 (Kokusai Denshinnn Denwa K.K.) 4 Oct. 1983.
French Search Report FR 9313782 (No Date).

*Primary Examiner*—Phan T. H. Palmer
*Attorney, Agent, or Firm*—Sughrue, Mion, Zinn, Macpeak & Seas

[57] ABSTRACT

Selection switches (C1, ..., C3-4) enable an optical path (BC, C1, C2-1, C3-1, D1, B1) to be selected from a plurality of such paths predefined on a common substrate (PE), each of the switches belonging to a plurality of such paths for that purpose. Isolation switches (D1, ..., DN) each belong to one such path only. The isolation switches are disposed at the ends of the paths so as to enable the selected path to be isolated from optical members (LEN) that are outside the selector and that are connected to the non-selected paths. In this way crosstalk is avoided. The invention applies in particular to backing up an optical link.

7 Claims, 2 Drawing Sheets

OPTICAL SELECTOR AND AN OPTICAL LINK INCLUDING THE SELECTOR

BACKGROUND OF THE INVENTION

The present invention relates to optical communications.

The present invention relates in particular to an optical selector enabling an optical path to be selected for an optical signal carrying data to be conveyed, the optical path being selected from a plurality of predefined optical paths, each of which might be taken by the signal. To limit the cost of such a selector, it is desirable to make it up as a cascaded chain of switches implemented in integrated form, i.e. on a common substrate. When a plurality of signals are supplied simultaneously at a plurality of terminals of a selector implemented in this way, crosstalk can appear. Such crosstalk occurs, for example, because if one of the signals to be conveyed is received on the end terminal that is specific to the selected optical path while other signals are received by the selector on the end terminals of other optical paths, then the conveyed signal is polluted by the other signals.

Document U.S. Pat. No. 4,998,791 (Koai) proposes to reduce the crosstalk of a switch by integrating couplers therein, the couplers being controlled by the same electrodes as the switch. Implementing a selector by using a large number of such switches would be costly.

SUMMARY OF THE INVENTION

A particular object of the invention is to provide a selector in such manner as to limit both its cost and its crosstalk.

To this end, the present invention provides an optical selector including optical switches formed on a common transparent substrate and constituting selection switches enabling an optical path to be selected from a plurality of such paths predefined on the substrate, each of the switches belonging to a plurality of such paths for that purpose, and each of the paths including a plurality of such switches in series, the selector being characterized by the fact that other optical switches formed on the substrate constitute isolation switches, each of which belongs to one such path only and is disposed at the end of the path so as to enable the path to be isolated from optical members outside the selector.

Another object of the present invention is to enable an optical communications link including stations and a plurality of optical lines connecting together two such stations to be backed up simply.

To this end, the present invention provides an optical link including a selector which may advantageously be of the above-specified type.

BRIEF DESCRIPTION OF THE DRAWINGS

An embodiment of the present invention is described in more detail below by way of non-limiting example and with reference to the diagrammatic figures of the accompanying drawings. When the same element is shown in more than one figure, it is given the same reference. In the accompanying drawings.

DETAILED DESCRIPTION OF A PREFERRED EMBODIMENT

Figure 1:
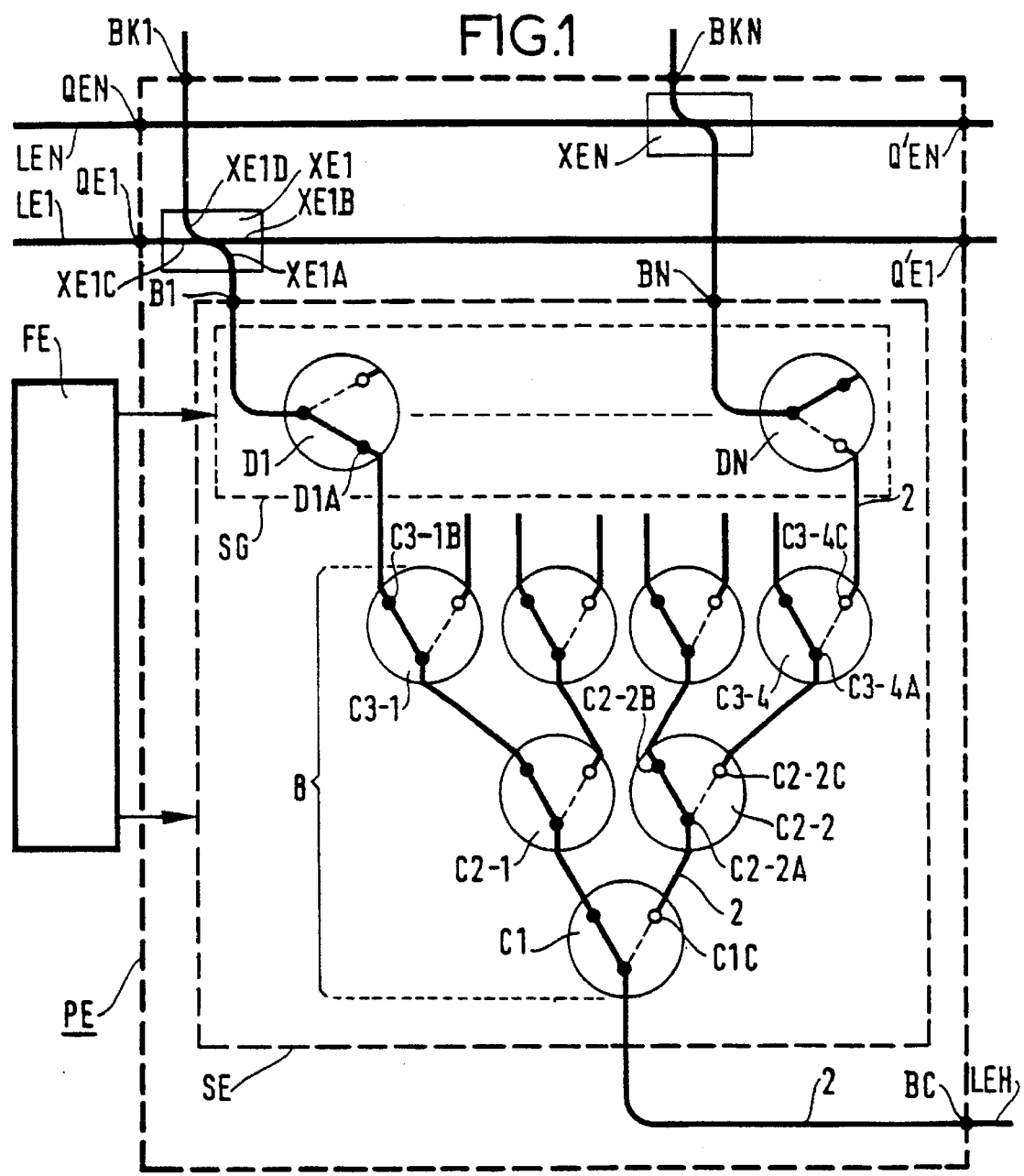
FIG. 1 is a view of a selector of the invention.
Figure 2:
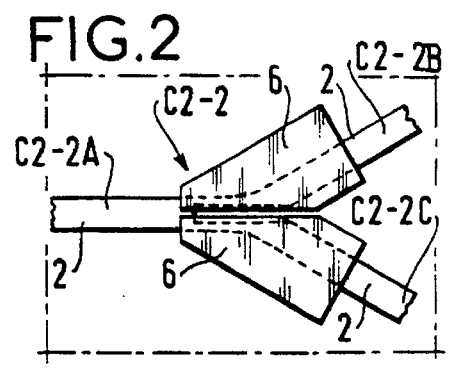
FIG. 2 is a view of an optical switch of the selector.

As shown in FIGS. 1 and 2, an optical selector of the invention includes the following components:

A plurality of individual terminals B1, . . . , BN suitable for being optically connected to respective ones of a plurality of individual optical waveguides LE1, . . . , LEN outside the selector.

A common terminal BC suitable for being optically connected directly to a common optical waveguide LEH outside the selector.

A transparent substrate PE having refractive index differences forming optical waveguides 2. The propagation of light along the waveguides is responsive to electrical control action and the waveguides are disposed so as to constitute the optical portion of a set of optical switches SE further including an electrical portion for taking the control action.

And electrodes (6, FIG. 2) formed on the substrate so as to constitute the electrical portion.

The set of switches includes a selection set 8, the switches in the selection set constituting selection switches C1, . . . , C3-4. Each of the selection switches such as C2-2 includes a bottom terminal C2-2A and a plurality of top terminals C2-2B, C2-2C, and is capable of selecting any one of the top terminals on command so as to connect the bottom terminal optically to the selected top terminal such as C2-2B. The selection switches are disposed so that they can form a plurality of optical paths (BC, C1, C2-1, C3-1, C3-1B) . . . , (BC, C1, C2-2, C3-4, C3-4C) corresponding to respective ones of the plurality of individual terminals B1, . . . , BN, each of which paths connects the common terminal BC to the individual terminal corresponding to the path. Each path such as BC, . . . , C3-4C includes a succession of switches such as C1, C2-2, C3-4 having ranks 1, . . . , 3 in the succession. A first switch of the path C1 has its bottom terminal connected to the common terminal BC. A second switch C2-2 of the path has its bottom terminal C2-2A connected to a top terminal C1-C of the first switch, and so on to the last switch C3-4 of the path. The path further includes an end terminal C3-4C constituted by a top terminal of the last switch, a connection being provided between the end terminal C3-4C of the path and the individual terminal BN corresponding to the path. Given the transparency of the substrate, it is possible for interfering optical coupling to appear between the various paths.

The selector further includes a control member FE disposed so as to receive a selection signal designating a selected individual terminal B1. The control member responds by controlling selection switches so as to open the optical path BC, C1, C2-1, C3-1, C3-1B corresponding to the selected individual terminal. In this way, it connects the selected individual terminal to the common terminal BC.

According to a characteristic of the present invention, the set of optical switches SE also includes an isolation stage SG formed by a plurality of isolation switches D1, . . . , DN corresponding to respective ones of the plurality of individual terminals B1, . . . , BN and to respective ones of the optical paths. Each isolation switch such as D1 includes both a bottom terminal such as D1A connected to the end terminal C3-1B of the path corresponding to the switch, and also a top terminal B1 connected to the individual terminal such as B1 corresponding to the switch (e.g. the top terminal is constituted by that individual terminal). The switch is either switched on so as to connect its two terminals together, or else switched off so as to isolate them, so that said connection between the end terminal and the individual terminal is respectively made or broken on command.

The control member FE responds to a selection signal by controlling the isolation switches so as to switch on the isolation switch D1 corresponding to the selected individual terminal B1, and so as to switch off the other isolation switches DN.

More particularly, each of the selection switches such as C2-2 has two top terminals C2-2B, C2-2C, namely the right terminal C2-2C and the left terminal C2-2B of the switch.

The selection switches form a succession of selection stages. A first stage includes a switch C1 constituting the first switch of all of the optical paths. A second stage C2-1, C2-2 includes two switches constituting second switches of the paths, and having their bottom terminals such as C2-2A connected to respective ones of the two top terminals such as C1-C of the switch of the first stage. At least some of the switches such as C3-4 of each selection stage have their bottom terminals such as C3-4A connected to respective ones of the top terminals such as C2-2C of switches such as C2-2 of the preceding selection stage.

Even more particularly, and as shown, all of the paths include the same number of selection switches, which number is the same as the number of the selection stages, and, for example is 3, the number of the individual terminals being $N=2^k$ and, for example, being 8. Each selection stage of rank i, e.g. 3, then includes $2^{i-1}$ e. g. 4 selection switches C3-1, . . . , C3-4. The bottom terminals such as C3-4A of the switches are connected to respective ones of the top terminals such as C2-2C of the switches such as C2-2 of the preceding stage.

Preferably the substrate PE also includes a plurality of passive optical couplers XE1, . . . , XEN associated with the selector and corresponding to respective ones of the plurality of individual terminals B1, . . . , BN. Each of the couplers such as XE1 has at least three, and for example four branches such as XE1A, XE1B, XE1C, and XE1D. These branches are formed in said substrate. Branch XE1A is connected to the individual terminal B1 corresponding to the coupler. Branches XE1B, XE1C, and XE1D are connected respectively to terminals Q' E1 QE1 and BK1 of the substrate, which terminals also correspond to the coupler. The same applies for the other Couplers up to coupler XEN to which terminals BN, Q' EN, QEN, and BKN likewise correspond.

Figure 3:
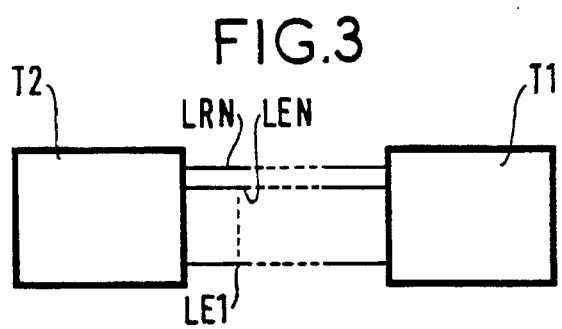
FIG. 3 is a view of an optical link including the selector.
Figure 4:
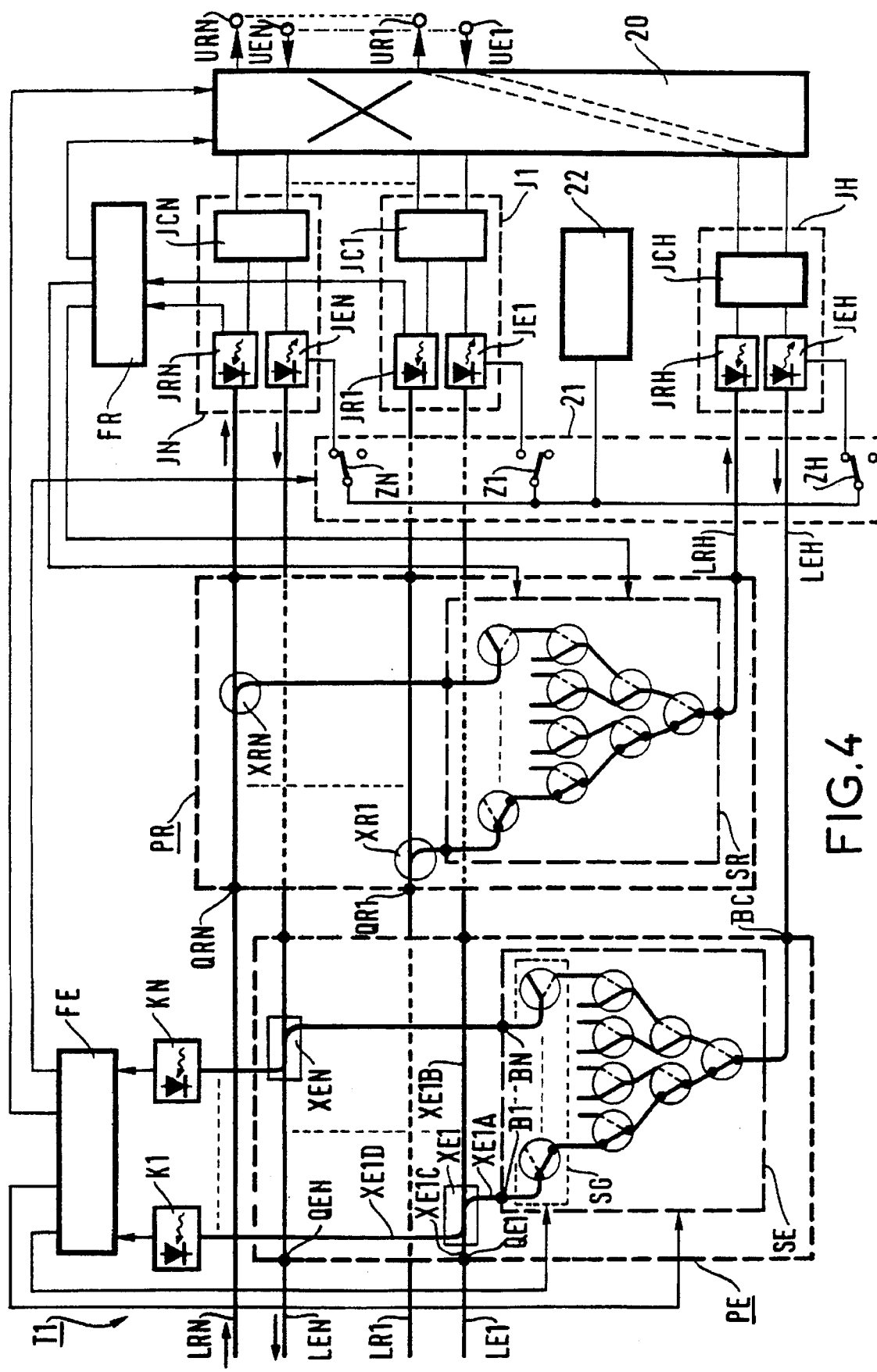
FIG. 4 is a view of a station of the link.

As shown in FIGS. 3 and 4, the present invention also provides an optical link including two stations T1 and T2. Each of the stations is connected to N users who may be subscribers to a network, circuits, or any other types of data transmitter or data receiver. Each of the stations sets up calls with the users by transmitting a number N of electrical signals in parallel, and transforms the N electrical signals into N optical signals corresponding to respective ones of the electrical signals. The link also includes a number N of optical fiber transmission lines LE1, . . . , LEN corresponding to respective ones of the optical signals so that each transmission line transmits the corresponding optical signal between the two stations.

Each station such as T1 includes:

N electrical terminals UEI, . . . , UEN having respective numbers 1, . . . , N, and connected to respective ones of the N users;

N optical terminals QE1, . . . , QEN having respective numbers 1, . . . , N and being connected to respective ones of the N optical fiber transmission lines LE1, . . . , LEN; and a connector set for connecting the N electrical terminals to respective ones of the N optical terminals while transforming the electrical signals into optical signals.

The connector set itself includes the following components:

N ordinary connectors J1, . . . , JN having respective numbers corresponding to respective ones of the N transmission lines LE1, . . . , LEN. Each of the connectors transforms the electrical signal into the optical signal corresponding to the line. It is possible for the connector to fail, e.g. as is the case with connector J1. An electrical terminal UE1 or an optical terminal QE1 which was connected or switched over to the failed connector J1 is designated below as being an electrical terminal or an optical terminal that is concerned by the failure of the connector.

A standby connector JH for replacing an ordinary connector in the event that an ordinary connector such as J1 fails.

A failure detector which, in the event that an ordinary connector such as J1 fails, receives a selection signal representing the number of the failed detector. The failure detector constitutes the above-mentioned control member FE.

A switching network 20 controlled by the failure detector FE so that, so long as no ordinary connector fails, the network connects the N electrical terminals UE1, . . . , UEN to respective ones of the N ordinary connectors J1, . . . , JN, and, when an ordinary connector fails and becomes a failed connector J1, the network connects the electrical terminal UE1 concerned by the failure to the standby connector JH. The switching network may advantageously also make it possible to modify the correspondence between the electrical terminals of the station and the ordinary connectors.

A selector preferably such as the selector described above, and constituted by the components SE and FE.

The common terminal BC of the selector is connected to the standby connector JH. The control member of the selector is constituted by the failure detector FE. The number of individual terminals B1, . . . , BN of the selector is N, and the individual terminals have respective numbers 1, . . . , N. The failure detector gives an order of selection when an ordinary connector J1 fails, which order of selection designates that individual terminal B1 which has the same number as the failed connector, so as to connect that individual terminal to the standby connector JH.

Finally, the N above-mentioned passive optical couplers XE1, . . . , XEN constitute standby couplers for connecting each optical terminal such as QE1 of the station T1 to that ordinary connector J1 (via terminal Q'E1), and to that individual terminal B1 of the selector SE which have the same number 1 as the optical terminal of the station.

The above-described components of the station T1 may be referred to as "general" components of such a station because, as described above, they may be assigned either Go optical signal transmission by the station, or to optical signal reception thereby. However the references used in the figures illustrating the description correspond to optical signal transmission only. That is why it is considered below that the components described with their references constitute a transmission station organized to transmit optical signals. For that purpose, each ordinary connector J1 of the transmission station includes an emitter JE1 constituted by a semiconductor laser. The emitter is powered with a bias electrical current from a power source 22. The emitter receives one of said electrical signals so as to transmit one of said optical signals modulated by the electrical signal. The failure detector and the selector of the transmission station respectively constitute a transmission failure detector FE, and a transmission selector SE, FE. Preferably, the transmission station T1 further includes N bias interrupters Z1, . . . , ZN having numbers 1, . . . , N and included in a block of interrupters 21. Each of the interrupters is connected in series between the power source 22 and the emitter JE1 of the ordinary connector J1 having the same number as the interrupter. The interrupters are controlled by the transmission failure detector FE. When an ordinary connector such as J1 fails, the detector interrupts the bias electrical current of the emitter of the connector. This disposition offers an advantage in the event that the laser of the failed connector such as J1 continues to transmit an incorrect light wave. The disposition then prevents the incorrect wave from being injected into an optical line LE1 by the standby coupler XE1, and from interfering with the correct wave supplied by the standby connector JH. Preferably, and as shown, the standby connector JH includes a similar emitter JEH powered by the same source 22 via an interrupter ZH which is included in the block 21 and which is controlled by the transmission failure detector FE so as to transmit a bias current only when an ordinary connector fails.

Preferably, each standby coupler such as XE1 of the transmission station T1 includes two input branches XE1B and XE1A connected respectively to an ordinary connector such as J1, and to the corresponding individual terminal B1 of the transmission selector SE, and two output branches XE1C and XE1D connected respectively to an optical terminal QE1 of the station T1, and, via terminal BK1, to an optoelectrical transducer K1 which is part of plurality of N such transducers K1, ..., KN. The transducer supplies one of said selection electrical signals to the failure detector FE when a light wave supplied to the transducer has abnormal characteristics.

Preferably, the components of the station T1 further constitute a reception station which also includes said general components so that the station T1 constitutes a combined station. The connectors such as J1, JN, or JH of the combined station correspond to respective ones of said connectors of the reception station, each connector including a receiver such as JR1, JRN, or JRH so as to constitute the corresponding connector of the reception station. Each such receiver is constituted by a detector semiconductor diode. The failure detector FR and the selector (SR-FR) of the reception station respectively constitute a reception failure detector and a reception selector. The reception failure detector is electrically connected to the outputs of the receivers of the ordinary connectors J1, ..., JN of the combined terminal so as to receive any selection signals therefrom.

More generally, each of the members such as SE which are described above as being components of the transmission station incorporated in the link station T1, and which are designated by a reference including the letter E, corresponds to a member such as SR performing analogous functions, but for reception, which member is one of the components of the reception station also incorporated in the link terminal T1 and is designated by the same reference as the corresponding component of the transmission station, with the sole difference being that the letter E is replaced in the reference by the letter R. The switching network 20 is common to the transmission station and to the reception station.

Each connector, such as J1, JN, or JH, of the combined station includes an emitter such as JE1, JEN, or JEH belonging to the transmission station, and a receiver such as JR1, JRN, or JRH belonging to the reception station. Each such connector also includes an electrical circuit such as JC1, JCN, or JCH for powering the emitter and the receiver, and for processing the electrical signals which are applied to them or which are supplied by them.

Preferably, station T2 of the link is constituted as indicated above for station T1.

We claim:

1. An optical selector including a plurality of controlled optical selection switches formed on a common transparent substrate (PE) and enabling an optical path (BC, C1, C2-1, C3-1, D1, B1) to be selected from a plurality of potential paths formed with respective input and output ends on said common transparent substrate so that said selected optical path can actually guide a light from said input end to said output end of said selected optical path and no other potential optical path can actually guide said light from said input end to said output end of said other potential optical path, each said controlled optical selection switch belonging to a plurality of said potential optical paths and each said potential path including a plurality of said controlled optical selection switches in series, wherein each said potential optical path further includes in series at at least one of said input end or output end thereof another controlled optical switch which is an isolation switch formed on said common transparent substrate and belonging only to said each potential optical path so as to enable said each potential optical path to be isolated from optical members outside the optical selector.

2. An optical selector, which selector (SE, FE) includes:
a plurality of individual terminals (B1, ..., BN) suitable for being optically connected to respective ones of a plurality of individual optical waveguides (LE1, ..., LEN) outside the selector;
a common terminal (BC) suitable for being optically connected directly to a common optical waveguide (LEH) outside the selector;
a transparent substrate (PE) having refractive index differences forming optical waveguides (2), the propagation of light along the waveguides being responsive to electrical control action and the waveguides being disposed so as to constitute the optical portion of a set of optical switches (SE) further including an electrical portion for taking said control action; and
electrodes (6,) formed on the substrate so as to constitute the electrical portion;
the set of switches including a selection set (8), the switches in the selection set constituting selection switches (C1, ..., C3-4), each of the selection switches (C2-2) including a bottom terminal (C2-2A) and a plurality of top terminals (C2-2B, C2-2C), and being capable of selecting any one of the top terminals on command so as to connect the bottom terminal optically to the selected top terminal (C2-2B), the selection switches being disposed so that they can form a plurality of optical paths (BC, C1, C2-1, C3-1, C3-1B), ..., (BC, C1, C2-2, C3-4, C3-4C) corresponding to respective ones of the plurality of individual terminals (B1, ..., BN), each of which paths connects the common terminal (BC) to the individual terminal corresponding to the path, each path (BC, ..., C3-4C) including a succession of switches (C1, C2-2, C3-4) having ranks (1, ..., 3) in the succession, a first switch of the path (C1) having its bottom terminal connected t the common terminal (BC), a second switch (C2-2) of the path having its bottom terminal (C2-2A) connected to a top terminal (C1-C) of the first switch, and so on to the last switch (C3-4) of the path, the path further including an end terminal (C3-4C) constituted by a top terminal of the last switch, a connection being provided between the end terminal (C3-4C) of the path and the individual terminal (BN) corresponding to the path, it being possible for interfering optical coupling to appear in the substrate between the various paths;

the selector further including a control member (FE) disposed so as to receive a selection signal designating a selected individual terminal (B1) and capable of responding by controlling selection switches so as to open the optical path (BC, C1, C2-1, C3-1, C3-1B) corresponding to the selected individual terminal, thereby connecting the selected individual terminal to the common terminal (BC);

the selector being characterized by the fact that said set of optical switches (.SE) also includes an isolation stage (SG) formed by a plurality of isolation switches (D1, . . . , DN) corresponding to respective ones of the plurality of individual terminals (B1, . . . , BN) and to respective ones of the optical paths, each isolation switch (D1) including both a bottom terminal (D1A) connected to the end terminal (C3-1B) of the path corresponding to the switch, and also at least one top terminal (B1) connected to the individual terminal corresponding to the switch, the switch being either switched on so as to connect its two terminals together, or else switched off so as to isolate them, so that said connection between the end terminal and the individual terminal is respectively made or broken on command;

the control member (FE) also being capable of responding to a selection signal by controlling the isolation switches so as to switch on the isolation switch (D1) corresponding to the selected individual terminal (B1), and so as to switch off the other isolation switches (DN).

3. A selector according to claim 2, characterized by the fact that it also includes a plurality of passive optical couplers (XE1, . . . , XEN) corresponding to respective ones of the plurality of said individual terminals (B1, . . . , BN), each of the couplers (XE1) having at least three branches (XE1A, XE1B, XE1C) formed in said transparent substrate (PE), a branch (XE1A) of the coupler being connected to the individual terminal (B1) corresponding to the coupler.

4. An optical link including two stations (T1, T2), each of which sets up calls with N users by transmitting a number N of electrical signals in parallel, and transforms the N electrical signals into N optical signals corresponding to respective ones of the electrical signals; and a number N of optical fiber transmission lines (Le1, . . . , LEN) corresponding to respective ones of the optical signals, so that each transmission line transmits the corresponding optical signal between the two stations;

each station including:

N electrical terminals (UE1, . . . , UEN) having respective numbers (1 . . . , N), and connected to respective ones of the N users;

N optical terminals (QE1, . . . , QEN) having respective numbers (1, . . . , N) and being connected to respective ones of the N optical fiber transmission lines (LE1, . . . , LEN); and a connector set for connecting the N electrical terminals to respective ones of the optical terminals while transforming the electrical signals into optical signals, the connector set itself including:

N ordinary connectors (J1, . . . , JN) having respective numbers corresponding to respective ones of the N transmission lines (LE1, . . . , LEN), each connector transforming the electrical signal into the optical signal corresponding to the line, it being possible for each of the connectors to fail, an electrical terminal (UE1) or an optical terminal (QE1) which was connected or switched over to the failed connector (J1) constituting an electrical terminal or an optical terminal that is concerned by the failure of the connector;

a standby connector (JH) for replacing one of the ordinary connectors in the event that said one of the ordinary connectors (J1) fails;

a failure detector (FE) which, in the event that an ordinary connector (J1) fails, receives a selection signal representing the number of the failed detector;

a switching network (20) controlled by the failure detector (FE) so that, so long as no ordinary connector fails, the network connects the N electrical terminals (UEI, . . . , UEN) to respective ones of the N ordinary connectors (J1, . . . , JN), and, when an ordinary connector fails and becomes a failed connector (J1), the network connects the electrical terminal (UE1) concerned by the failure to the standby connector (JH);

a selector (SE, FE). including a plurality of individual terminals (B1, . . . , BN) suitable for being optically connected to respective ones of a plurality of individual optical waveguides (LE1, . . . , LEN) outside the selector;

a common terminal (BC) suitable for being optically connected directly to a common optical waveguide (LEH) outside the selector;

a transparent substrate (PE) having refractive index differences forming optical waveguides (2), the propagation of light along the waveguides being responsive to electrical control action and the waveguides being disposed so as to constitute the optical portion of a set of optical switches (SE) further including an electrical portion for taking said control action; and electrodes (6) formed on the substrate so as to constitute the electrical portion;

the set of switches including a selection set (8), the switches in the selection set constituting selection switches (C1, . . . , C3-4), each of the selection switches (C2-2) including a bottom terminal (C2-2A) and a plurality of top terminals (C2-2B, C2-2C), and being capable of selecting any one of the top terminals on command so as to connect the bottom terminal optically to the selected top terminal (C2-2B), the selection switches being disposed so that they can form a plurality of optical paths (BC, C1, C2-1, C3-1, C3-1B), . . . , (BC, C1, C2-2, C3-4, C3-4C) corresponding to respective ones of the plurality of individual terminals (B1, . . . , BN), each of which paths connects the common terminal (BC) to the individual terminal corresponding to the path, each path (BC, . . . , C3-4C) including a succession of switches (C1, C2-2, C3-4) having ranks (1, . . . , 3) in the succession, a first switch of the path (C1) having its bottom terminal connected to the common terminal (BC), a second switch (C2-2) of the path having its bottom terminal (C2-2A) connected to a top terminal (C1-C) of the first switch, and so on to the last switch (C3-4) of the path, the path further including an end terminal (C3-4C) constituted by a top terminal of the last switch, a connection being provided between the end terminal (C3-4C) of the path and the individual terminal (BN) corresponding to the path, it being possible for interfering optical coupling to appear in the substrate between the various paths;

the selector further including a control member (FE) disposed so as to receive a selection signal designating a selected individual terminal (B1) and capable of responding by controlling selection switches so as to open the optical path (BC, C1, C2-1, C3-1, C3-1B) corresponding to the selected individual terminal, thereby connecting the selected individual terminal to the common terminal (BC);

the common terminal (BC) of the selector being connected to the standby connector (JH), the control member of the selector being constituted by the failure detector (FE), the number of individual terminals (B1, . . . , BN) of the selector being N, and the individual terminals having respective numbers (1, . . . , N), the failure detector giving an order of selection when an ordinary connector (J1) fails, which order of selection designates that individual terminal (B1) which has the same number as the failed connector, so as to connect that individual terminal to the standby connector (JH); and N passive optical couplers (XE1, . . . , XEN) constituting standby couplers for connecting each optical terminal (QE1) of the station (T1) to that ordinary connector (J1) and to that individual terminal (B1) of the selector (SE), which have the same number (1) as the optical terminal of the station;

said link being characterized by the fact that in said selector, said set of optical switches (SE) also includes an isolation stage (SG) formed by a plurality of isolation switches (D1, . . . , DN) corresponding to respective ones of the plurality of individuals terminals (B1, . . . , BN) and to respective ones of the optical patios, each isolation switch (D1) including both a bottom terminal (D1A) connected to the end terminal (C3-1 B) of the path corresponding to the switch, and also at least one top terminal (B1) connected to the individual terminal corresponding to the switch, the switch being either switched on so as to connect its two terminals together, or else switched off so as to isolate them, so that said connection between the end terminal and the individual terminal is respectiveJy made or broken on command;

the control member (FE) also being capable of responding to a selection signal by controlling the isolation switches so as to switch on the isolation switch (D1) corresponding to the selected individual terminal (B1), and so as to switch off the other isolation switches (DN).

5. A link according to claim 4, in which at least some of the components of a station of the link (T1) constitute a transmission station, each ordinary connector (J1) of the transmission station including an emitter (JE1) constituted by a semiconductor laser and powered with a bias electrical current from a power source (22), and receiving one of said electrical signals so as to transmit one of said optical signals modulated by the electrical signal, the failure detector and the selector of the transmission station respectively constituting a transmission failure detector (FE), and a transmission selector (SE, FE);

the link being characterized by the fact that the transmission station (T1) further includes N bias interrupters (Z1, . . . , ZN) having numbers (1, . . . , N), each interrupter being connected in series between said power source (22) and the emitter (JE1) of the ordinary connector (J1) having the same number as the interrupter, the interrupter being controlled by the transmission failure detector (FE) when an ordinary connector (J1) fails, so as interrupt the bias electrical current of the emitter of the connector.

6. A link according to claim 5, characterized by the fact that each standby coupler (such as XE1) of the transmission station (T1) includes two input branches (XE1B, XE1A) connected respectively to an ordinary connector (such as J1), and to the corresponding individual terminal (B1) of the transmission selector (SE), and two output branches (XE1C, XE1D) connected respectively to an optical terminal (QE1) of the station (T1), and to an optoelectrical transducer (K1, . . . , KN) supplying one of said selection electrical signals to the failure detector (FE) when a light wave supplied to the transducer has abnormal characteristics.

7. A link according to claim 5, characterized by the fact that the components of said station (T1) of the link further constitute a reception station, so that the station of the link constitutes a combined station, the connectors (J1, JN, JH) of the combined station corresponding to respective ones of said connectors of the reception station, each connector including a receiver (JR1, JRN, JRH) so as to constitute the corresponding connector of the reception station, the failure detector (FR) and the selector (SR, FR) of the reception station respectively constituting a reception failure detector (FR) and a reception selector (SR, FR), the reception failure detector being electrically connected to the outputs of the receivers of the ordinary connectors (J1, . . . , JN) of the combined terminal so as to receive any selection signals therefrom.

* * * * *